United States Patent
Floros et al.

(10) Patent No.: US 9,641,004 B2
(45) Date of Patent: May 2, 2017

(54) SYSTEM AND METHOD FOR BALANCING CHARGE BETWEEN BATTERY CELLS

(75) Inventors: John H. Floros, Novi, MI (US); Paul W. Firehammer, Saline, MI (US)

(73) Assignee: A123 Systems, LLC, Waltham, MA (US)

( * ) Notice: Subject to any disclaimer, the term of this patent is extended or adjusted under 35 U.S.C. 154(b) by 485 days.

(21) Appl. No.: 14/112,102

(22) PCT Filed: Apr. 17, 2012

(86) PCT No.: PCT/US2012/033939
§ 371 (c)(1),
(2), (4) Date: Oct. 16, 2013

(87) PCT Pub. No.: WO2012/145319
PCT Pub. Date: Oct. 26, 2012

(65) Prior Publication Data
US 2014/0042980 A1    Feb. 13, 2014

Related U.S. Application Data

(60) Provisional application No. 61/477,295, filed on Apr. 20, 2011.

(51) Int. Cl.
*H02J 7/00* (2006.01)
*H01M 10/44* (2006.01)
*H01M 10/42* (2006.01)

(52) U.S. Cl.
CPC ......... *H02J 7/0014* (2013.01); *H01M 10/441* (2013.01); *H02J 7/0016* (2013.01); *H01M 2010/4271* (2013.01)

(58) Field of Classification Search
CPC ...................................... H02J 7/0013
USPC ........................................... 320/116
See application file for complete search history.

(56) References Cited

U.S. PATENT DOCUMENTS

| | | | | |
|---|---|---|---|---|
| 2004/0164706 A1* | 8/2004 | Osborne | ............... | H02J 7/0018 320/116 |
| 2011/0089897 A1* | 4/2011 | Zhang | ................... | H02J 7/0016 320/116 |
| 2012/0074895 A1* | 3/2012 | Roeper | ................. | H02J 7/0019 320/103 |

FOREIGN PATENT DOCUMENTS

| JP | 2004007983 A | 1/2004 |
|---|---|---|
| JP | 2010029050 A | 2/2010 |
| JP | 2010183831 A | 8/2010 |
| KR | 20100020113 A | 2/2010 |

OTHER PUBLICATIONS

Korean Intellectual Property Office, International Search Report pf PCT/US2012/033939, WIPO, Jul. 31, 2012, 2 pages.

* cited by examiner

*Primary Examiner* — Edward Tso
*Assistant Examiner* — Ahmed Omar
(74) *Attorney, Agent, or Firm* — McCoy Russell LLP (57) ABSTRACT

Systems and methods for balancing charge of battery cells of a battery pack are disclosed. In one example, battery cell balancing may be improved by balancing battery cells of a battery cell stack simultaneously. The system and method may be particularly useful battery packs that may be constructed with battery cell stacks that vary in a number of series battery cells.

17 Claims, 8 Drawing Sheets

SYSTEM AND METHOD FOR BALANCING CHARGE BETWEEN BATTERY CELLS

CROSS REFERENCE TO RELATED APPLICATIONS

This application claims priority from International Patent Application Serial No. PCT/US2012/033939, filed Apr. 17, 2012 and entitled SYSTEM AND METHOD FOR BALANCING CHARGE BETWEEN BATTERY CELLS, which claims priority to U.S. Provisional Patent Application Ser. No. 61/477,295, filed Apr. 20, 2011 and entitled SYSTEM AND METHOD FOR BALANCING CHARGE BETWEEN BATTERY CELLS, the entirety of both which are hereby incorporated herein by reference for all intents and purposes.

TECHNICAL FIELD

The present description relates to balancing charge of a plurality of battery cells of a battery pack. In one example, the battery cells are included in a battery pack that provides power to a vehicle.

BACKGROUND AND SUMMARY

Charge imbalances between battery cells of a battery pack may result from manufacturing differences between battery cells or from the composition of materials from which the battery cells are fabricated. Charge imbalances between battery cells may be undesirable because some battery cells may have to be charged or discharged before other battery cells so that the full charge capacity of the battery may not be reached. However, timing of balancing charge between battery cells may also induce charge imbalance between battery cells. For example, if a first battery cell stack begins to drain or add charge to its battery cells while a second battery cell stack does not, charge imbalance between the battery cells of the two battery cell stacks may increase. Further, if the battery cell stacks are sourcing or sinking current during the charge balancing process, the cells being drained of charge via charge balancing circuitry may reach the upper or lower charging limit threshold before the remaining battery cells.

The inventors herein have recognized the above issues and developed an approach to address them. In particular, the inventors have developed a method for balancing charge of a battery pack, the battery pack comprising a plurality of battery cell stacks, comprising: balancing charge of at least one battery cell of the battery pack during a second battery cell charge balancing cycle responsive to at least one battery cell charge sample from a plurality of battery cells sampled during a first battery cell charge balancing cycle.

By applying battery cell charging information gathered during a first battery charge balancing cycle to a second battery charge balancing cycle, it may be possible to start balancing of battery cell stacks that have different numbers of battery cells electrically coupled in series at substantially the same time. Therefore, there may be less possibility of generating charge imbalance from the charge balancing process. For example, even though it may take different amounts of time to process battery cell charge balancing data for two battery cell stacks comprised of different numbers of battery cells, adjusting charge balance of the battery cells via the latest battery cell charge data can be delayed until charge balancing is started in a subsequent battery charge balancing cycle so that the time required to process the battery charge balancing data has substantially no affect on the start timing of battery cell charge balancing. In this way, charge balancing of a battery pack comprised of battery cell stacks having different numbers of battery cells may be improved.

The present description may provide several advantages. Specifically, the approach can reduce the possibility of inducing charge imbalance between battery cells via a battery charge balancing process. In addition, the approach may be accomplished with little or no cost as compared to prior approaches where battery charge imbalance may have been induced during the battery charge balancing process.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
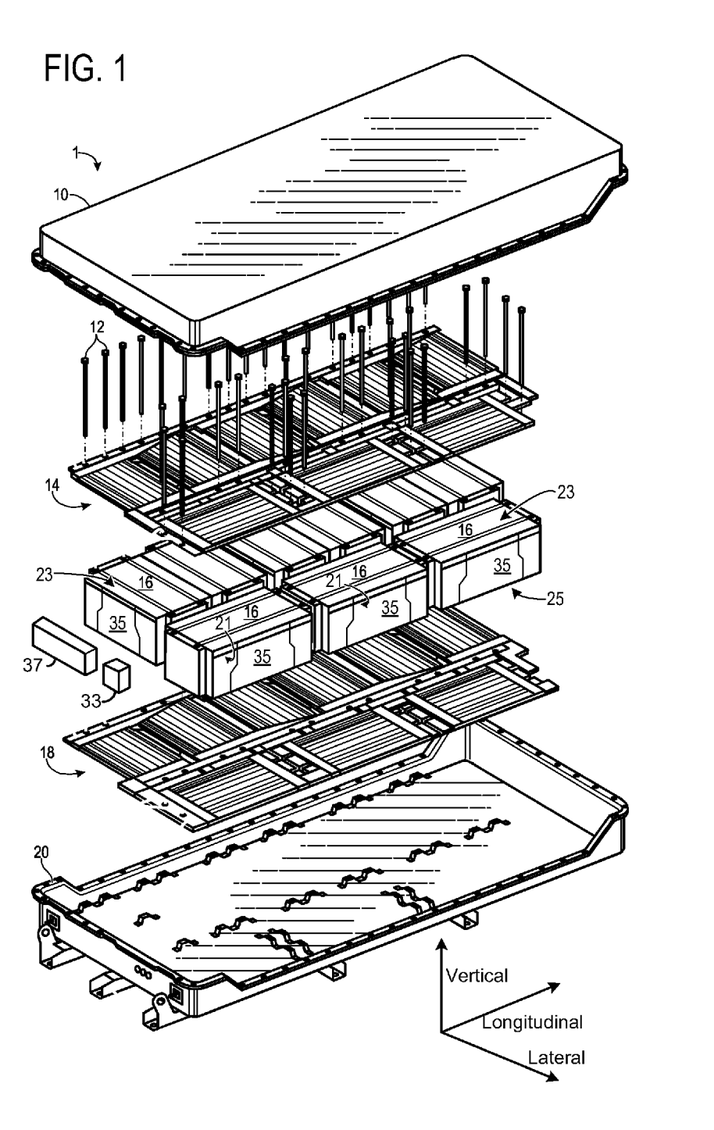
FIG. 1 shows an exploded schematic view of a battery pack or assembly.
Figure 5:
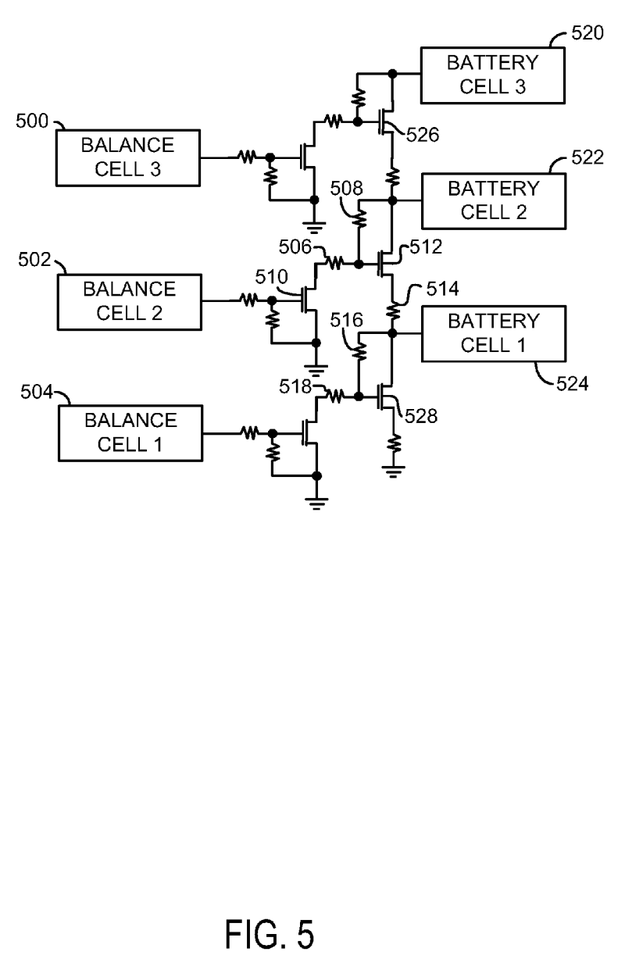
FIG. 5 shows an example electrical schematic diagram for an example battery pack.
Figure 6:
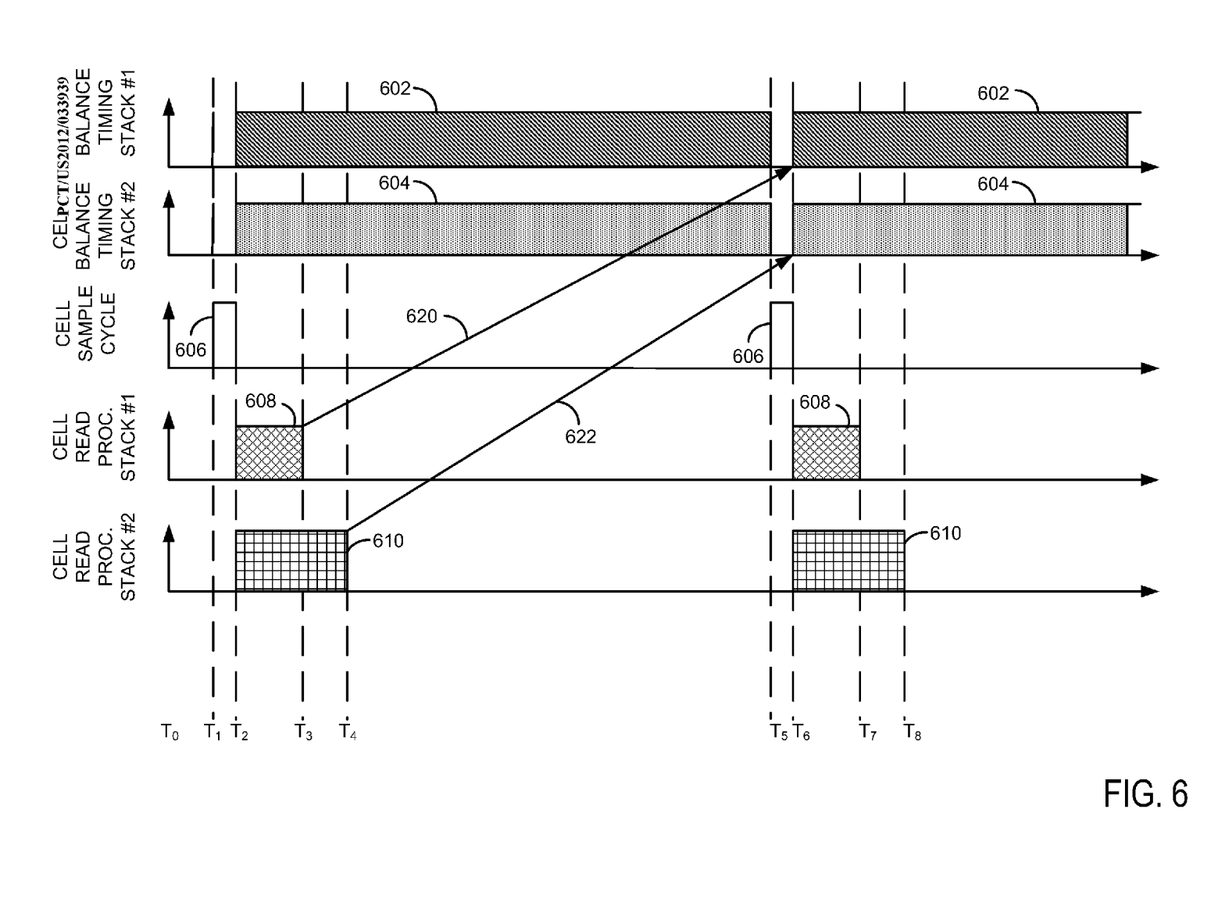
FIG. 6 shows a prophetic example timing sequence for balancing battery cells according to the method of FIGS. 8 and 9.
Figure 7:
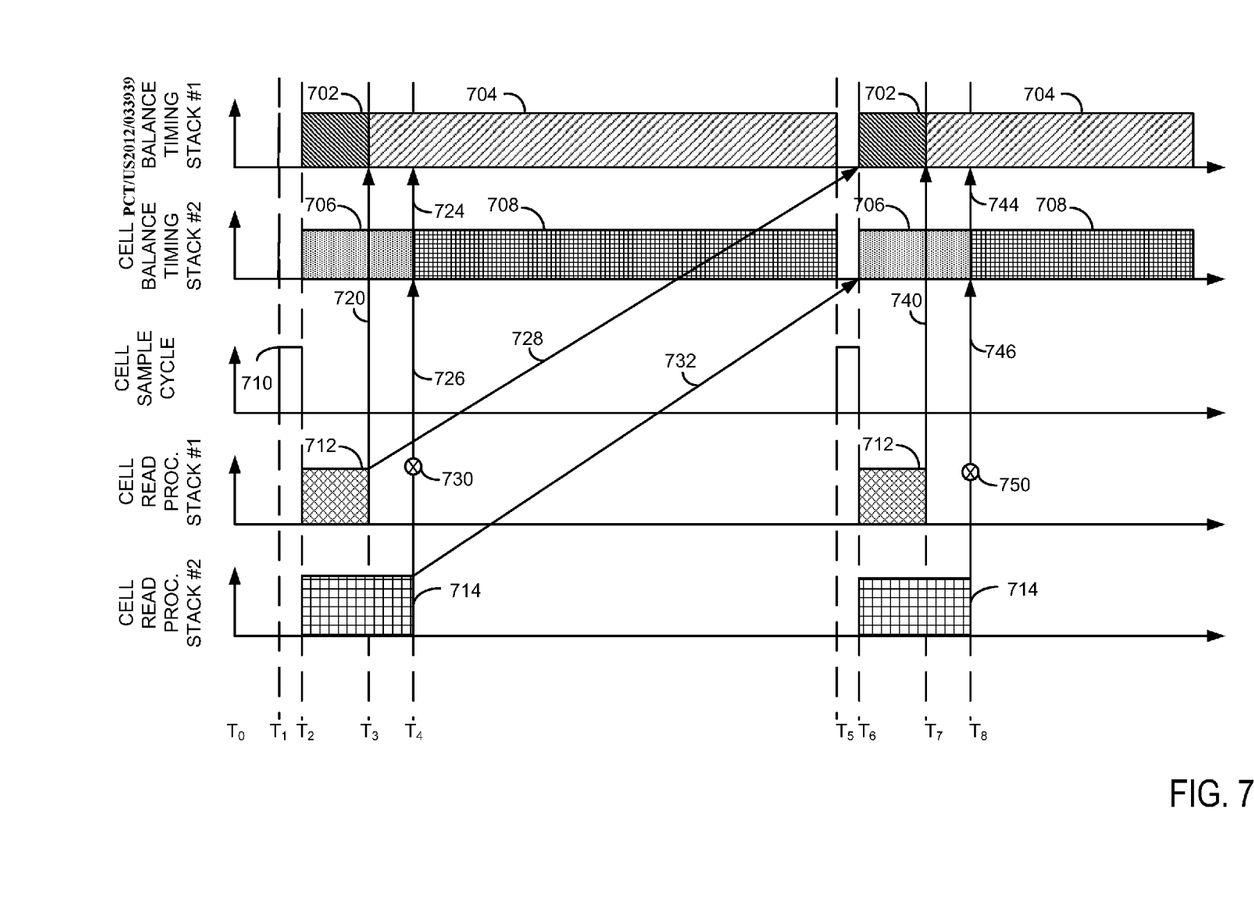
FIG. 7 shows another prophetic example timing sequence for balancing battery cells according to the method of FIGS. 8 and 9.

The present description is related to verifying balancing charge between battery cells of a battery pack. In one example, the battery cells may be included in a battery pack as illustrated in FIG. 1. Battery cells such as those illustrated in FIGS. 2-3 may be combined as shown in FIG. 1. Further, the battery cell stacks may be comprised of different numbers of battery cells as shown in the electrical schematic of FIG. 4. In one example, battery balancing is accomplished via passive circuitry as shown in FIG. 5. FIGS. 6 and 7 show battery cell balancing sequences according to the method of FIGS. 8 and 9.

FIG. 1 shows an exploded view of a battery assembly 1. The battery assembly may include a cover 10, coupling devices 12, a first cooling subsystem 14 (e.g., cold plate), a plurality of battery cell modules 16, a second cooling subsystem 18 (e.g., cold plate), and a tray 20. The cover may be attached to the tray via a suitable coupling device (e.g., bolts, adhesive, etc.,) to form a housing surrounding the coupling devices, the cooling subsystems, and the battery modules, when assembled.

The battery cell modules 16 may include a plurality of battery cells configured to store energy. Although a plurality of battery modules are illustrated, it will be appreciated that in other examples a single battery module may be utilized. Battery cell modules 16 may be interposed between the first cooling subsystem 14 and the second cooling subsystem 18, where the battery modules are positioned with their electrical terminals on a side 21 facing out between the cooling subsystems.

Each battery module may include a first side 23 and a second side 25. The first and the second side may be referred to as the top and bottom side, respectively. The top and bottom sides may flank the electrical terminals, discussed in greater detail herein with regard to FIGS. 2-3. In this example, the top side of each battery module is positioned in a common plane in the battery assembly. Likewise, the bottom side of each battery module is positioned in another common plane in the battery assembly. However, in other examples only the top side or the bottom side of each battery module may be positioned in a common plane. In this way, the cooling subsystems may maintain direct contact with the top sides and the bottom sides of the battery modules to increase heat transfer and improve cooling capacity, as described in further detail herein, wherein the cooling subsystems and the battery modules may be in face-sharing contact. Additional details of an exemplary battery module are described herein with regard to FIGS. 2-3. In alternate examples, only one of the cooling subsystems may be included in battery assembly 1, such as an upper cooling subsystem (subsystem 14 in this example). Moreover, the position, size, and geometry of the first and second cooling subsystems are exemplary in nature. Thus, the position, size, and/or geometry of the first and/or second cooling subsystems may be altered in other examples based on various design parameters of the battery assembly.

Battery assembly 1 may also include an electrical distribution module 33 (EDM), monitor and balance boards 35 (MBB), and a battery control module 37 (BCM). Charge or voltage of battery cells in battery cell modules 16 may be monitored and balanced by MBBs that are integrated onto battery cell modules 16. Balancing battery cells refers to equalizing charge between a plurality of battery cells in a battery cell stack. Further, battery cell charge between battery cell stacks can be equalized. MBBs may include a plurality of current, voltage, and other sensors. The EDM controls the distribution of power from the battery pack to the battery load. In particular, the EDM contains contactors for coupling high voltage battery power to an external battery load such as an inverter. The BCM provides supervisory control over battery pack systems. For example, the BCM may control ancillary modules within the battery pack such as the EDM and cell stack MBBs. Further, the BCM may be comprised of a microcontroller having random access memory, read only memory, input ports, real time clock, output ports, and a controller area network (CAN) port for communicating to systems outside of the battery pack as well as to MBBs and other battery pack modules.

Figure 2:
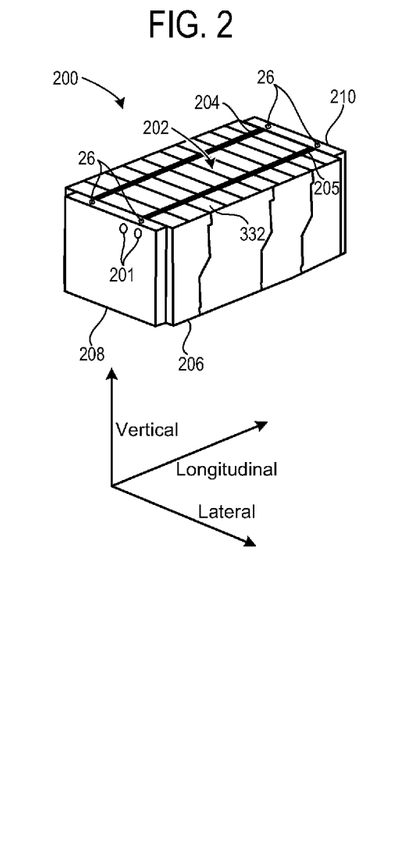
FIG. 2 shows a schematic view of an exemplary battery module.

FIG. 2 shows an exemplary battery module 200 that may be included in the plurality of battery cell modules 16, shown in FIG. 1. Battery module 200 may include a battery cell stack having a plurality of stacked battery cells and output terminals 201. The stacked arrangement allows the battery cells to be densely packed in the battery module.

Figure 3:
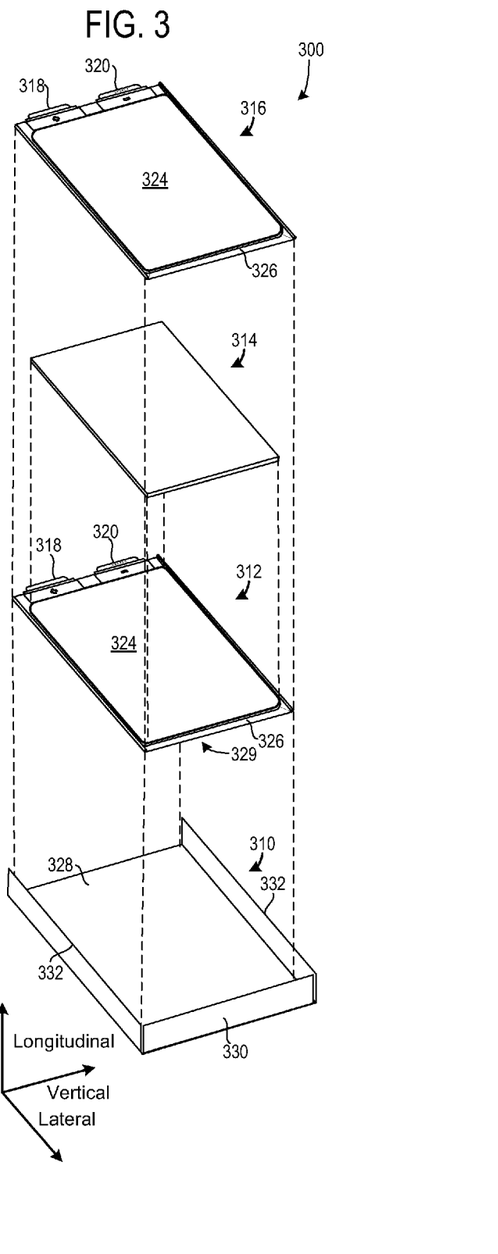
FIG. 3 shows an exploded schematic view of an exemplary battery cell stack.

FIG. 3 shows an exploded view of a portion of an exemplary battery cell stack 300. As shown the battery cell stack is built in the order of a housing heat sink 310, battery cell 312, compliant pad 314, battery cell 316, and so on. However, it will be appreciated that other arrangements are possible. For example, the battery cell stack may be built in the order of a housing heat sink, battery cell, housing heat sink, etc. Further in some examples, the housing heat sink may be integrated into the battery cells.

Battery cell 312 includes cathode 318 and anode 320 for connecting to a bus bar (not shown). The bus bar routes charge from one batter cell to another. A battery module may be configured with battery cells that are coupled in series and/or parallel. Bus bars couple like battery cell terminals when the battery cells are combined in parallel. For example, the positive terminal of a first battery cell is coupled to the positive terminal of a second battery cell to combine the battery cells in parallel. Bus bars also couple positive and negative terminal of battery cell terminals when it is desirable to increase the voltage of a battery module. Battery cell 312 further includes prismatic cell 324 that contains electrolytic compounds. Prismatic cell 324 is in thermal communication with cell heat sink 326. Cell heat sink 326 may be formed of a metal plate with the edges bent up 90 degrees on one or more sides to form a flanged edge. In the example of FIG. 3, two opposing sides include a flanged edge. However, other geometries are possible. Battery cell 312 is substantially identical to battery cell 316. Therefore, similar parts are labeled accordingly. Battery cells 312 and 316 are arranged with their terminals in alignment and exposed. In battery module 200 shown in FIG. 2 the electric terminals are coupled to enable energy to be extracted from each cell in the battery module. Returning to FIG. 3, compliant pad 314 is interposed between battery cell 312 and battery cell 316. However, in other examples the compliant pad may not be included in the battery cell stack.

Housing heat sink 310 may be formed by a metal plate having a base 328 with the edges bent up 90 degrees on one or more sides to form a flanged edge. In FIG. 3 longitudinally aligned edge 330 and vertically aligned edges 332 are bent flanged edges. As depicted, the housing heat sink is sized to receive one or more battery cells. In other words, one or more battery cells may be positioned within base 328. Thus, the flanged edges of the battery cells may be in contact with housing heat sink and underside 329 of battery cell 312 may be in contact with the base of the housing heat sink, facilitating heat transfer.

One of the longitudinally aligned edges 332 of the housing heat sink 310 may form a portion of the top side 202 of battery module 200, as shown in FIG. 2. Similarly, one of the longitudinally aligned edges 332 may form a portion of the bottom side of the battery module. Thus, the longitudinally aligned edges of the housing heat sink may be in contact with the first and the second cooling subsystems to improve heat transfer. In this way, heat may be transferred from the battery cells to the exterior of the battery module.

The battery cells may be strapped together by binding bands 204 and 205. The binding bands may be wrapped around the battery cell stack or may simply extend from the front of the battery cell stack to the back of the battery cell stack. In the latter example, the binding bands may be coupled to a battery cover. In other examples, the binding bands may be comprised of threaded studs (e.g., metal threaded studs) that are bolted at the ends. Further, various other approaches may be used to bind the cells together into the stack. For example, threaded rods connected to end plates may be used to provide the desired compression. In another example, the cells may be stacked in a rigid frame with a plate on one end that could slide back and forth against the cells to provide the desired compressive force. In yet other examples, rods held in place by cotter pins may be used to secure the battery cells in place. Thus, it should be understood that various binding mechanisms may be used to hold the cell stack together, and the application is not limited to metal or plastic bands. Cover 206 provides protection for battery bus bars (not shown) that route charge from the plurality of battery cells to output terminals of the battery module.

The battery module may also include a front end cover 208 and a rear end cover 210 coupled to the battery cell stack. The front and rear end covers include module openings 26. However, in other examples the module openings may be included in a portion of the battery module containing battery cells.

Figure 4:
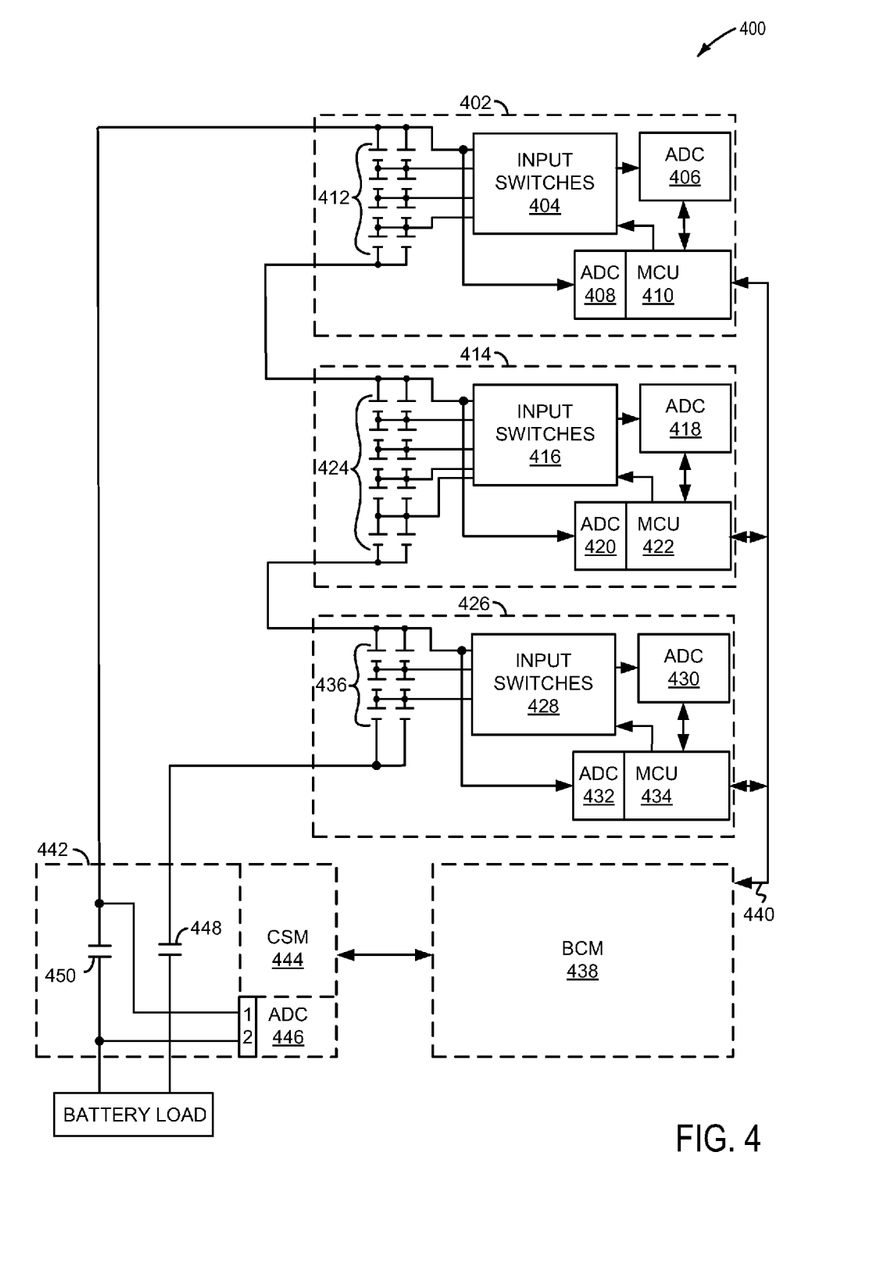
FIG. 4 shows an example electrical schematic diagram for an example battery pack.

Referring now to FIG. 4, a schematic diagram of a system for assessing ADC operation and battery voltages within a battery pack 400 is shown. In this example, battery pack 400 includes three battery cell stacks 402, 414, and 426 as indicated by the dashed lines. Battery cells 412, 424, and 436 are shown having different numbers of battery cells electrically coupled in series. In particular, battery cell group 412 includes four groups of series battery cells, battery cell group 424 includes five groups of series battery cells, and battery cell group 436 includes three groups of series battery cells. However, battery cell stacks may be configured with the same numbers of series coupled battery cells. And, as discussed above, the current capacity or amp-hour rating of the battery cell stack may be related to the number of battery cells connected in parallel. As the number of battery cells arranged in parallel increases, the battery cell stack amp-hour rating increases. As the number of battery cells arranged in series increases, the output voltage of the battery cell stack increases.

Thus, the voltage output of a battery pack can be increased or decreased by changing the number of battery cells arranged in a series connection. Likewise, the battery pack amp-hour rating may be increased or decreased by changing the number of battery cells arranged in parallel. Therefore, in this example the battery pack voltage may be increased by adding additional battery cells in series with the battery cells of battery cell stacks 402, 414, and 426. Alternatively, the battery cell stack amp-hour rating may be increased by adding more battery cells in parallel to battery cells 412, 424, and 436.

Battery cell stacks 402, 414, and 426 include input switches 404, 416, and 428 for selectively coupling ADCs 406, 418, and 430 to battery cells 412, 424, and 436 respectively. Alternatively, input switches 404, 416, and 428 may be configured to selectively couple individual battery cells of battery cell stacks 402, 414, and 426 to capacitors that may be selectively coupled to ADCs 406, 418, and 430. Monitor control units (MCUs) 410, 422, and 434 control the state of switches 404, 416, and 428 by way of digital outputs from the respective MCUs. Input switches 404, 416, and 428 are configured such that ADCs 406, 418, and 430 may be coupled to individual battery cells. Alternatively, capacitors may be selectively coupled to the individual battery cells to measure battery cell voltage without being influenced by the voltage of battery cells that may be placed in series with the battery cell being measured. The ADCs can subsequently measure voltage of the capacitors as a way to determine battery cell charge. In one example, each MCU 410, 422, and 434 may couple each series connected battery cell and/or a capacitor holding battery cell charge to respective ADCs 406, 418, and 430. When battery cells are coupled in parallel, input switches 404, 416, and 428 couple ADCs 406, 418, and 430 or capacitors to the battery cells of a cell stack that are coupled in parallel. Thus, each ADC coupled to a battery cell stack may be configured to measure the voltage of one or more battery cells coupled in parallel within the respective battery cell stack.

ADCs 406, 418, and 430 are configured as high resolution (e.g., 12 or 16 bit resolution ADCs) devices that are external or off chip from MCUs 410, 422, and 434, although ADCs may be on chip in other embodiments and may have different resolutions (e.g., 8 bit resolution). In one example, ADCs 406, 418, and 430 communicate to MCUs 410, 422, and 430 respectively by way of SPI ports. The SPI ports are used to transfer battery cell voltages to each MCU as the individual MCUs command input switches 404, 416, and 428 to cycle through battery cells 412, 424, and 436 respectively. By cycling through the switches, individual series battery cells and/or capacitors holding battery cell charge are coupled to ADCs 406, 418, and 430 for determining battery cell voltages.

ADCs 408, 420, and 432 are lower resolution (e.g., 8 bit resolution) devices that are integrated to MCUs 410, 422, and 434. In alternate embodiments, ADCs 408, 420, and 432 may be of higher resolution (e.g., 12 or 16 bit resolution) and external from MCUs 410, 422, and 434. ADCs 408, 420, and 432 are configured to measure the series voltage provided by battery cells 412, 424, and 436 and/or capacitors holding battery cell charge for the respective battery cell stacks 402, 414, and 426. For example, ADC 408 is configured to measure the voltage provided by the series combination of four battery cells coupled in parallel to four other battery cells, the battery cells indicated at 412. Thus, the ADC of an MBB is configured to measure the series combination of battery cells of a battery cell stack. Of course, an ADC of a MBB coupled to a battery cell stack may be configured to measure the voltage of additional or fewer battery cells than the four battery cells shown in FIG. 4. Further, as discussed above, the series combination of battery cells 412 acts to increase the output voltage of the battery cell stack 402.

MCUs 410, 422, and 434 control input switches 404, 416, and 428 as well as ADCs 406, 408, 418, 420, 430, and 432. Further, MCUs 410, 422, and 434 may store the respective battery voltages to memory and perform arithmetic and logical operations on battery voltage data captured by ADCs 406, 408, 418, 420, 430, and 432. In one example, BCM 438 is also configured to compare the battery pack voltage data provided by ADC 446 to the battery cell stack voltages provided by MCUs 410, 422, and 430. In one example, MCUs 410, 422, and 434 adds the battery cell stack voltages provided to MCUs 410, 422, and 434 by ADCs 406, 418, and 430 to form a sum of battery cell voltages for each battery cell stack. The sum of battery cell voltages are then compared to the battery cell stack voltages as measured by ADCs 408, 420, and 432. If each battery pack voltage is within a predetermined range of each sum of battery cell stack voltages, MCUs 410, 422, and 434 may store the battery pack and battery cell data in memory and report a pass or clear status to the BCM 438. For example, if the battery cell voltages of battery cell stack 402 provided by ADC 406 are summed, and the sum is within a predetermined range of the battery stack voltage provided by ADC 408, then MCU 410 may report favorable passage of a self test diagnostic to BCM 438. On the other hand, if the battery cell voltages of battery cell stack 402 provided by ADC 406 are summed, and the sum is not within a predetermined range of the battery stack voltage provided by ADC 408, then MCU 410 may report an indication of degradation of a battery stack system to BCM 438. Likewise, voltages of battery cell stack 414 may be determined from ADC 418 and ADC 420, and the voltages may then be compared by MCU 422. Similarly, voltages of battery cell stack 426 may be determined from ADC 430 and ADC 432, and the voltages may then be compared by MCU 434.

BCM 438 communicates with MCUs 410, 422, and 434 of battery cell stacks 402, 414, and 426 by way of CAN bus 440. BCM 438 may acquire battery voltages and status indicators (e.g., flags that indicate degradation of an ADC, battery cell, or MCU) from battery cell stacks 402, 414, and 426. BCM 438 also communicates with EDM 442 for sending instructions to close contactors 450 and 448 when it is desirable to couple battery cell stacks 402, 414, and 426 to the battery load. CSM 444 includes an ADC 446 for measuring battery pack voltage on the battery side of contactors 450 and 448. In some embodiments, ADC 446 or another ADC may also measure battery pack voltage on the load side of contactors 450 and 448. ADC 446 provides BCM 438 with battery pack voltage data.

BCM 438 is also configured to compare the battery pack voltage data provided by ADC 446 to the battery cell stack voltages provided by MCUs 410, 422, and 434. In one example, BCM 438 adds the battery cell stack voltages provided to BCM 438 by MCUs 410, 422, and 434 to form a sum of battery cell stack voltages which is then compared to the battery pack voltage as measured by ADC 446. If the battery pack voltage is within a predetermined range of the sum of battery cell stack voltages, BCM may store the battery pack and battery cell data in memory and report a pass or clear status to an external system. For example, if the battery cell stack voltages are summed and within a predetermined range of the battery pack voltage, then BCM 438 may report favorable passage of a self test diagnostic to a vehicle controller. On the other hand, if the battery cell stack voltages are summed and not within a predetermined range of the battery pack voltage, then BCM 438 may report an indication of degradation of a battery pack system to a vehicle controller.

Referring now to FIG. 5, a schematic view of example battery cell balancing control circuitry is shown. The high potential sides of battery cells 1-3 is shown at 520-524. Since the battery cells are coupled in series, the low side of one battery is coupled to the higher potential of another battery cell. Battery cell balancing may be initiated by a microcontroller (e.g., a MCU) on the MBB. Simplified microcontroller output circuitry to balance battery cells is illustrated at 500-504.

The battery cell balancing circuitry illustrated for battery cells 1-3 is substantially the same between battery balancing circuits except for transistor biasing resistors for the FET transistors that switch load resistors in parallel with battery cells. The biasing resistors are adjusted to compensate for the changing potential for each additional battery cell in the series of battery cells.

Charge of battery cell number 2 is reduced when FET 512 is activated (e.g., closed) thereby coupling load resistor 514 in parallel to battery cell number 2. FET 512 is activated when FET 510 conducts from a signal initiated by microcontroller signal input 502. When FET 510 conducts, one side of resistor 506 is referenced to ground while the other side is coupled to resistor 508 which in turn is coupled to the high potential side of battery cell number 2. Thus, the voltage developed between resistor 506 and 508, as applied to the gate of FET 512, is related to the voltage of battery cell number 2 with respect to ground and the ratio of resistances 506 and 508. FETs 526 and 528 that balance battery cell numbers 1 and 3 are the same as FET 512. Since the potential of battery cell 3 with respect to ground increases from that of battery cell number 2, the bias resistors coupled to the gate of FET 526 are adjusted to ensure FET 526 switches when microcontroller circuit input 500 changes state. Likewise, the potential of battery cell 1 with respect to ground decreases from that of battery cell number 2, and bias resistors 516 and 518 coupled to the gate of FET 528 are adjusted to ensure FET 528 switches when microcontroller circuit input 504 changes state.

Thus, the system described in FIGS. 1-5 provides for a system for charge balancing of a battery pack, comprising: a first battery cell stack comprised of a first number of battery cells; a first monitoring and charge balancing controller electrically coupled to the first battery cell stack, the first monitoring and charge balancing controller including instructions for monitoring and charge balancing battery cells in the first battery cell stack; a second battery cell stack comprised of a second number of battery cells different from the first number of battery cells; and a second monitoring and charge balancing controller electrically coupled to the second battery cell stack, the second monitoring and charge balancing controller including instructions for monitoring and charge balancing battery cells in the second battery cell stack, the second monitoring and charge balancing controller including further instructions for starting charge balancing of battery cells in the second battery cell stack substantially simultaneously with starting charge balancing of battery cells in the first battery cell stack. Such a system can improve battery cell charge balancing by allowing battery cells to be charge balanced at substantially the same time.

The system further comprises a battery control module including a battery controller, the battery controller in electrical communication with the first and second monitoring and charge balancing controllers. The system also includes where the battery controller includes instructions to initiate substantially simultaneous sampling of battery cells in the first and second battery cell stacks, the battery controller including further instructions for substantially simultaneously initiating charge balancing of battery cells in the first and second battery cell stacks. The system further includes where the first monitoring and charge balancing controller includes instructions for processing charge balancing data for the first number of battery cells and the second monitoring and charge balancing controller includes instructions for processing charge balancing data for the second number of battery cells.

In some examples, the system further comprises passive charge balancing circuitry electrically coupled to the first monitoring and charge balancing controller, and passive charge balancing circuitry electrically coupled to the second monitoring and charge balancing controller. In other examples, the system further comprises active charge balancing circuitry electrically coupled to the first monitoring and charge balancing controller, and active charge balancing circuitry electrically coupled to the second monitoring and charge balancing controller. Thus, the system may include active or passive battery cell charge balancing.

Referring now to FIG. 6, a prophetic example timing sequence for balancing charge of battery cells is shown. FIG. 6 includes horizontal markers $T_0$-$T_8$ for identifying timing of events of interest during the particular sequence. The sequence of FIG. 6 may be produced by executing the method of FIGS. 8 and 9 via computer instructions within the system described in FIGS. 1-5.

The first plot from the top of FIG. 6 represents timing of charge balancing of battery cells of a first battery cell stack. A high level signal indicates that battery cell charge balancing is active at the timing illustrated. The X axis represents time, and time increases from the left to right.

The second plot from the top of FIG. 6 represents timing of charge balancing of battery cells of a second battery cell stack. A high level signal indicates that battery cell charge balancing is active at the timing illustrated. The X axis represents time, and time increases from the left to right.

The third plot from the top of FIG. 6 represents timing of sampling charge of battery cells in preparation for battery cell charge balancing. A high level signal indicates that battery cell charge of each battery cell of each battery cell stack is being sampled at the timing illustrated. The X axis represents time, and time increases from the left to right.

The forth plot from the top of FIG. 6 represents timing of reading and processing the samples for battery cell stack number one. A high level indicates that battery cell samples are being processed. A low level indicates that battery sample processing is complete.

The fifth plot from the top of FIG. 6 represents timing of reading and processing the samples for battery cell stack number two. A high level indicates that battery cell samples are being processed. A low level indicates that battery sample processing is complete.

At time $T_0$, battery stacks number one and two are not balancing battery cells. Further, the battery cells are not being read nor are samples of battery charge being read or processed to determine if it may be desirable to balance battery cells.

At time $T_1$, a battery cell sample cycle is initiated as indicated by the cell sample signal 606 transitioning to a high state. In one example, the BCM sends a battery sample signal to each MCU of each MBB. During a battery cell sample cycle, charge of each series connected battery cell in each battery cell stack is sampled. Note that battery cells connected in parallel in a battery cell stack may be treated as a single series connected battery cell. In one example, charge of a battery cell is sampled via directing charge from the battery cell to a capacitor. The capacitor holds the charge until a voltage of the capacitor is input to an ADC. In this way, the charge from each battery cell of the battery pack can be simultaneously sampled so that each battery cell is sampled under similar operating conditions. Thus, all of the battery cells of all battery pack cell stacks are sampled substantially simultaneously.

At time $T_2$, the battery sample cycle is complete as indicated by the cell sample cycle signal transitioning to a low state. In addition, balancing charge of battery cells in battery cell stack numbers one and two is initiated as indicated by the cell balance timing stack #1 signal 602 and cell balance timing stack #2 signal 604 transitioning to a high state. Further, processing of battery samples begins as indicted by cell read and processing signals 608 and 610 for battery cell stack numbers one and two transitioning to a high state. The BCM may issue an end of battery cell sample command or alternatively, the battery cell sample cycles may end after a specified amount of time has passed since the battery cell sample cycle was initiated. Thus, all of the battery cell stacks begin to process battery charge samples and balance charge between battery cells by actively or passively charging or discharging battery cells substantially simultaneously after the battery charge sample cycle is complete.

Battery cell balancing may entail electrically coupling a resistor or charge transferring device (e.g. a transformer or capacitor) to a battery cell for a predetermined amount of time that is related to an amount of charge desired to be drained from or sourced to the battery cell. For example, given a voltage of a battery cell and resistance of a load resistor a current flow through the load resistor from the battery cell can be determined according to Ohm's law, thereby providing a way to determine the amount of charge drawn from the battery cell to the load resistor. The load resistor may be coupled to the battery cell for an amount of time it takes to draw a desired amount of charge from the battery cell at the current flow as determined from the battery cell voltage and the resistance of the load resistor. On the other hand, active charging circuitry may be provided as is described in U.S. patent application Ser. No. 12/820,433 which is hereby fully incorporated by reference for all intents and purposes to add charge or add and drain charge substantially simultaneously from battery cells.

In one example, processing the battery cell sample data includes where an ADC of each MBB of each battery cell stack converts the sampled battery cell voltage to a digital number suitable for processing during the battery cell data processing cycle. In one example, battery cell charge balancing processing is locally performed within a battery cell stack solely via the MCU in the MBB. For example, the MCU can determine the charge of each serial battery cell and charge may be drained from higher capacity battery cells based on the difference in charge between the higher capacity battery cells and the lower capacity battery cells within the battery cell stack. In this way, processing of battery cell sampling may be retained within a battery cell stack.

In another example, battery cell data may be manipulated by the MBB MCU and sent to the BCM for further processing. In one example, the BCM determines the battery cells with the highest and lowest charge as part of the processing. Further, based on differences in charge between the battery cells having the lowest charge value and the remaining battery cells of the battery pack, the BCM decides how much charge to drain from each battery cell of the battery pack, if any, and then sends data to each MCU of each battery cell stack. In one example, the data is an amount of charge to add or drain charge from battery cells via passive or active charging circuitry. In one example, the amount of charge to be drained from battery cells is determined via subtracting the charge of lower capacity battery cells within the battery cell pack from the charge of higher capacity battery cells within the battery cell pack. The remainder of the subtractions (e.g., charge amounts) may be the amount of charge to be drained from the higher capacity battery cells within the battery pack.

At time $T_3$, sample processing for battery cell stack number one is complete as indicated by the cell sample processing stack #1 signal transitioning to a low level. In this example, battery cell balancing for the present battery charge balancing cycle is not based on the battery cell information processed during the present battery charge balancing cycle. Rather, battery cell balancing during a subsequent battery cell balancing cycle is responsive to or based on the battery cell information processed during the present battery charge balancing cycle. In particular, battery cell charge balancing of battery cell stack number one is adjusted at time $T_6$ (e.g., charge is increased or decreased for individual battery cells within battery cell stack number one) based on the battery cell charge balancing information and parameters determined by the end of the battery charge balancing processing at time $T_3$. Thus, the processed battery sample information, data, and/or parameters are stored in memory and is a basis for battery cell charge balancing during a subsequent battery cell charge balancing cycle.

Marking arrow 620 indicates the timing of where battery cell sample processed data determined between times $T_2$ and $T_3$ is the basis for battery cell charge balancing of battery cell stack number one. Specifically, battery cell sample processed data for battery cell stack number one determined between times $T_2$ and $T_3$ is applied to battery cell stack number one at time $T_6$ as indicated by arrow 620. In one example, a battery cell charge balancing cycle may be defined as a time interval between when a battery cell charge sample is initiated until initiation of a subsequent battery cell charge sample cycle. For example, in the present example, a battery cell charge balancing cycle occurs from time $T_1$ to time $T_5$. It should be noted that battery cell charge balancing for every battery cell of a battery cell stack or of a battery pack does not have to end at the time of a subsequent battery cell charge sample as is shown in FIG. 6. Rather, battery cell charge balancing may terminate any time before a subsequent battery cell charge sample and may be related to an amount of charge added or drained from battery cells of a battery cell stack.

Charge balancing for battery cell stack numbers one and two continues at time $T_3$ based on battery cell information or data processed during a prior battery charge balancing cycle. The battery cell information or data may be stored as battery cell charge balancing parameters. Further, the battery cell sample cycle remains low indicating that battery cells within the battery pack are not presently being sampled and battery cell sample processing for battery stack number two continues. The battery cell sample processing for battery stack number two may continue longer than battery cell sample processing for battery stack number one because battery cell stack number two includes more battery cells electrically connected in series.

At time $T_4$, sample processing for battery cell stack number two is complete as indicated by the cell sample processing stack #2 signal transitioning to a low level. Similar to battery cell stack number one, battery cell balancing for the present battery charge balancing cycle is not based on the battery cell information processed during the present battery charge balancing cycle. Rather, battery cell balancing during a subsequent battery cell charge balancing cycle is responsive to or based on the battery cell information processed during the present battery charge balancing cycle. In particular, battery cell charge balancing of battery cell stack number two is adjusted at time $T_6$ (e.g., charge is increased or decreased for individual battery cells within battery cell stack number one) based on the balancing information determined by the end of the battery charge balancing processing at time $T_4$.

Marking arrow 622 indicates the timing of where battery cell sample processed data determined between times $T_2$ and $T_4$ is the basis for battery cell charge balancing of battery cell stack number two. Specifically, battery cell sample processed data for battery stack number two determined between times $T_2$ and $T_4$ is applied to battery cell stack number two at time $T_6$ as indicated by arrow 622.

Battery cell charge balancing for battery cell stack numbers one and two continues at time $T_4$ based on battery cell information processed during a prior battery charge balancing cycle. Further, the battery cell sample cycle remains low indicating that battery cells within the battery pack are not presently being sampled.

At time $T_5$, a second battery cell sample cycle is initiated as indicated by the cell sample signal 606 transitioning to a high state. In addition, charge balancing between battery cells in battery cell stack numbers one and two ceases. In some examples, battery cell charge balancing between battery cells may end well before a battery cell sample cycle is initiated depending on the amount of charge drained from the battery cell and the frequency of battery cell sample cycles. Further, sample processing for battery cell stacks number one and two is ceased during the second battery cell sample cycle.

At time $T_6$, the second battery cell sample cycle is terminated and battery cell charge balancing is activated for battery cell stack numbers one and two as indicated by cell balance timing signals 602 and 604. Further, processing of battery charge samples begins again as indicted by cell reading and processing signals 608 and 610 for battery cell stack numbers one and two transitioning to a high state.

At time $T_7$, processing of battery samples ends for battery cell stack number one. The processed battery sample information or data is stored in memory and is a basis for battery cell charge balancing during a subsequent battery balancing cycle (not shown). Battery cell charge balancing continues for battery cell stack numbers one and two after time $T_7$ as indicated by the high level signals cell balance timing for battery cell stacks number one and two.

At time $T_8$, processing of battery samples ends for battery cell stack number two. The processed battery sample information or data is stored in memory and is a basis for battery cell charge balancing during a subsequent battery balancing cycle (not shown). Battery cell charge balancing continues for battery cell stack numbers one and two after time $T_8$ as indicated by the high level signals cell balance timing for battery cell stacks number one and two.

Thus, the battery balancing cycle between time $T_1$ and $T_5$ is repeated after time $T_5$. It can be seen from FIG. 6 that battery charge cell balancing for both battery cell stacks begins substantially simultaneously at times $T_2$ and $T_6$. Accordingly, charge may be extracted, drained, and/or added to the battery cells of battery cell stack number one at the same time as charge is extracted, drained, and/or added to battery cells of battery cell stack number two. In this way, battery cell charge balancing between battery cells in battery cell stacks number one and two may be substantially maintained even when the battery pack is sourcing or sinking current. Further, additional numbers of battery cell stacks may be charge balanced as shown in FIG. 6. For example, five different battery stacks including five different numbers of battery cells may be charge balanced as shown in FIG. 6.

Referring now to FIG. 7, the signals of FIG. 7 are similar to those of FIG. 6. Therefore, for the sake of brevity, only the differences between the signals of FIG. 6 and FIG. 7 will be described. The sequence of FIG. 7 may be produced by executing the method of FIGS. 8 and 9 via computer instructions within the system described in FIGS. 1-5.

At time $T_0$, all signals are at a low level indicating no balancing, cell sampling, cell reading, or cell processing is occurring. At time $T_1$, a battery cell sample cycle in initiated as indicated by cell read signal 710 transitioning to a high state. The battery cell sample cycle may be initiated internally in a battery cell stack or via the BCM.

At time $T_2$, the battery cell sample cycle ends and battery cell charge balancing for battery cell stack numbers one and two begins. Signals 702 and 706 indicate the beginning of battery cell charge balancing for battery cell stack numbers one and two while signal 710 transitions to a low level indicating the end of the battery sample cycle. The battery cell charge balancing begins based on battery cell sample processing that occurred during a previous battery balancing cycle (e.g., before time $T_1$). For example, it may be determined that 0.5 coulombs are to be drained from a first battery cell in battery cell stack number one and 0.6 coulombs are to be drained from a second battery cell in battery cell stack number two based on processed battery cell sample data from a previous battery cell balancing cycle. Thus, in the sequence of FIG. 7, balancing of battery cell stacks begins with data or information gathered and stored in a prior battery cell charge balancing cycle.

Reading processing of samples from the battery cell read cycle at time $T_1$ also begins at time $T_2$ as indicated by signals 712 and 714 transitioning to a high level. Sample processing may include performing mathematical operations on battery cell parameters and data as described above with regard to FIG. 6 (e.g., determining charge differences between battery cells).

At time $T_3$, sample processing of battery cell stack number one is complete and ends as indicated by signal 712 transitioning to a low state. The processed battery cell sample information from battery cell stack number one is the basis for adjusting battery cell balancing at battery cell stack number one during the present battery cell charge balancing cycle and the subsequent battery cell charge balancing cycle. The cross hatched pattern of signal 702 changes to the cross hatched pattern of 704 as indicated by arrow 720 to indicate that battery cell balancing of the battery cells of battery stack number one is changed according to the battery sample data processed at 712. For example, as discussed above with reference to time $T_2$, a first battery cell of battery cell stack may be initially scheduled to have 0.5 coulombs drained from it based on processed battery cell data from a previous battery cell balancing cycle. However, at time $T_3$, the amount of charge drained from the first battery cell may be revised to 0.55 coulombs based on the processed sample data at 712. Consequently, the hatching at 704 is changed from the hatching at 702 to indicate that the balancing of charge between battery cells has been adjusted. It should also be mentioned that charge of a single battery cell is balanced according to the above description; however, several battery cells within a battery cell stack may be balanced at substantially the same time for the sequences of FIGS. 6 and 7.

The processed battery data for battery stack number one indicated by 712 and completed at $T_3$ is also a basis for battery charge balancing of battery stack number one at time $T_6$ as indicated by marking arrow 728. The processed battery data for battery cell stack number one indicated by 712 is stored to memory and is retrieved from memory for battery cell charge balancing at $T_6$. Thus, the processed battery data for battery cell stack number one is the basis for balancing battery cell charge for at least a portion of the present battery cell charging cycle (e.g., time $T_1$ to $T_5$) and the subsequent battery cell charging cycle (e.g. time after $T_5$).

At time $T_4$, sample processing of battery cell stack number two is complete and ends as indicated by signal 714 transitioning to a low state. The processed battery cell sample information from battery cell stack number two is the basis for adjusting battery cell balancing at battery cell stack number two during the present battery cell charge balancing cycle. The checker pattern of signal 706 changes to a different checker pattern at 708 as indicated by arrow 726 to indicate that battery cell balancing of the battery cells of battery stack number two is changed according to the battery sample data processed at 714. For example, as discussed above with reference to time $T_2$, a second battery cell of battery cell stack may be initially scheduled to have 0.6 coulombs drained from it based on processed battery cell data from a previous battery cell balancing cycle. However, at time $T_4$, the amount of charge drained from the second battery cell may be revised to 0.45 coulombs based on the processed sample data as indicated at 714 and ceased at time $T_4$. Consequently, the checkering at 708 is changed from the checkering at 706 to indicate that the balancing of charge between battery cells has been adjusted.

The processed battery data for battery stack number two indicated by 714 and completed at $T_4$ is also a basis for battery cell charge balancing of battery stack number two at time $T_6$ as indicated by marking arrow 732. The processed battery data for battery stack number two indicated by 714 is stored to memory and is retrieved from memory for battery cell charge balancing. Thus, the processed battery data for battery stack number two is the basis for balancing battery cell charge for at least a portion of the present battery cell charging cycle (e.g., time $T_1$ to $T_5$) and the subsequent battery cell charging cycle (e.g. time after $T_5$).

In some examples, processed battery data for battery stacks that finish processing battery cell samples early in the present battery cell charge balancing cycle may not be the basis for updating battery cell charge balancing during the present battery charge balancing cycle until processing of all battery data for the present battery charge balancing cycle is complete. For example, processed battery data for battery cell stack number one which completes at time $T_3$, is the basis for updating battery cell charge balancing at time $T_4$ as indicated by arrow 724 which begins at circle X 730. Thus, for individual battery cell stacks, battery cell charge balancing parameters during the present battery cell balancing cycle may be updated when processing of the individual battery cell stack data is complete or when processing of all battery cell stack data is complete.

Marking arrow 720 shows that when processing of battery cell sample data for battery cell stack number one (e.g. signal 712) ends, the processed sample data is the basis for revising battery cell balancing of battery cell stack number one as indicated by signal 702 changing to signal 704. Similarly, marking arrow 726 shows that when processing of battery cell sample data for battery cell stack number two (e.g. signal 714) ends, the processed sample data is the basis for revising battery cell balancing of battery cell stack number two as indicated by signal 706 changing to signal 708 or battery cell stack number one at 724 and battery cell stack number two at 726. Thus, although the battery cell balancing may be continuous, the amount of charge drained from the battery cells of a battery cell stack may be revised during the present battery cell balancing cycle (e.g., from time $T_1$ to time $T_5$).

At time $T_5$, a second battery cell charge balancing cycle is initiated as indicated by the battery cell sample cycle signal 710 transitioning to a high level. It should be noted that a battery cell charge balancing cycle may be initiated after a time when all battery cell charge balancing has been completed.

At time $T_6$, battery cell charge balancing is reinitiated for the second battery cell charge balancing cycle. Battery cell charge balancing for battery cell stack numbers one and two is initiated at substantially the same timing so as to reduce the possibility of inducing charge imbalance between battery cells that may result from battery cell charge balancing. In addition, processing of battery samples is also initiated as indicated by cell reading and processing signals for battery cell stack numbers one and two transitioning to a high state.

At time $T_7$, processing of battery cell charge data is stopped and used as a basis for revising charge balancing for battery cells of battery cell stack number one. Marker arrow 740 indicates that the battery cell charge balancing parameters and amount of charge added to or drained from battery cells of battery stack number one are updated. Further, cell balancing timing signal 702 transitions from a cross hatch to the cross hatch of cell balancing timing signal 704 to indicate that battery cell charge balancing parameters and the amount of charge drained or added to battery cells of battery cell stack number one is updated.

At time $T_8$, processing of battery cell charge data is stopped and used as a basis for revising charge balancing for battery cells of battery cell stack number two. Marker arrow 746 indicates that the battery cell charge balancing parameters and amount of charge added to or drained from battery cells of battery stack number two are updated. Further, cell balancing timing signal 706 transitions from a first checker pattern to the second checker pattern timing signal 708 to indicate that battery cell charge balancing parameters and the amount of charge drained or added to battery cells of battery cell stack number two is updated. In addition, in some examples, where charge balancing parameters of battery cell stacks is not updated until processing of battery cell charge data is complete, marker arrow 744 and circle X 750 show when processed data from battery cell stack number one is the basis for updating battery cell charge balancing of battery cell stack number one.

Figure 8:
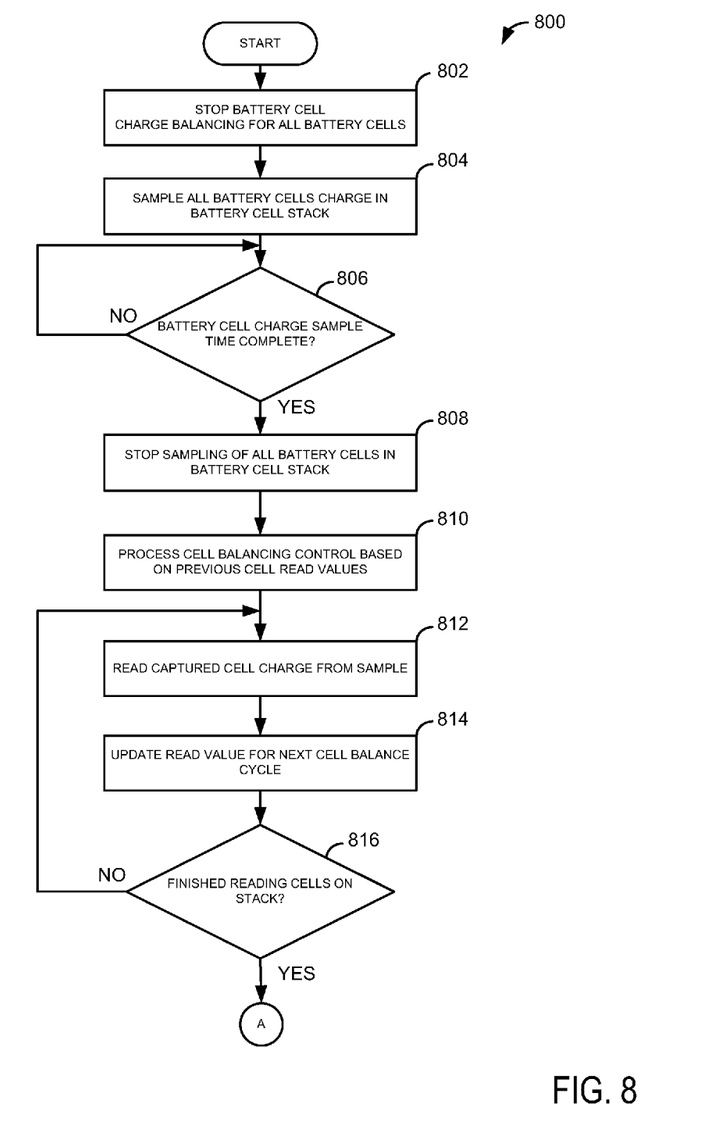
FIG. 8 shows a flowchart of a method for verifying a reference voltage for battery cell monitoring.
Figure 9:
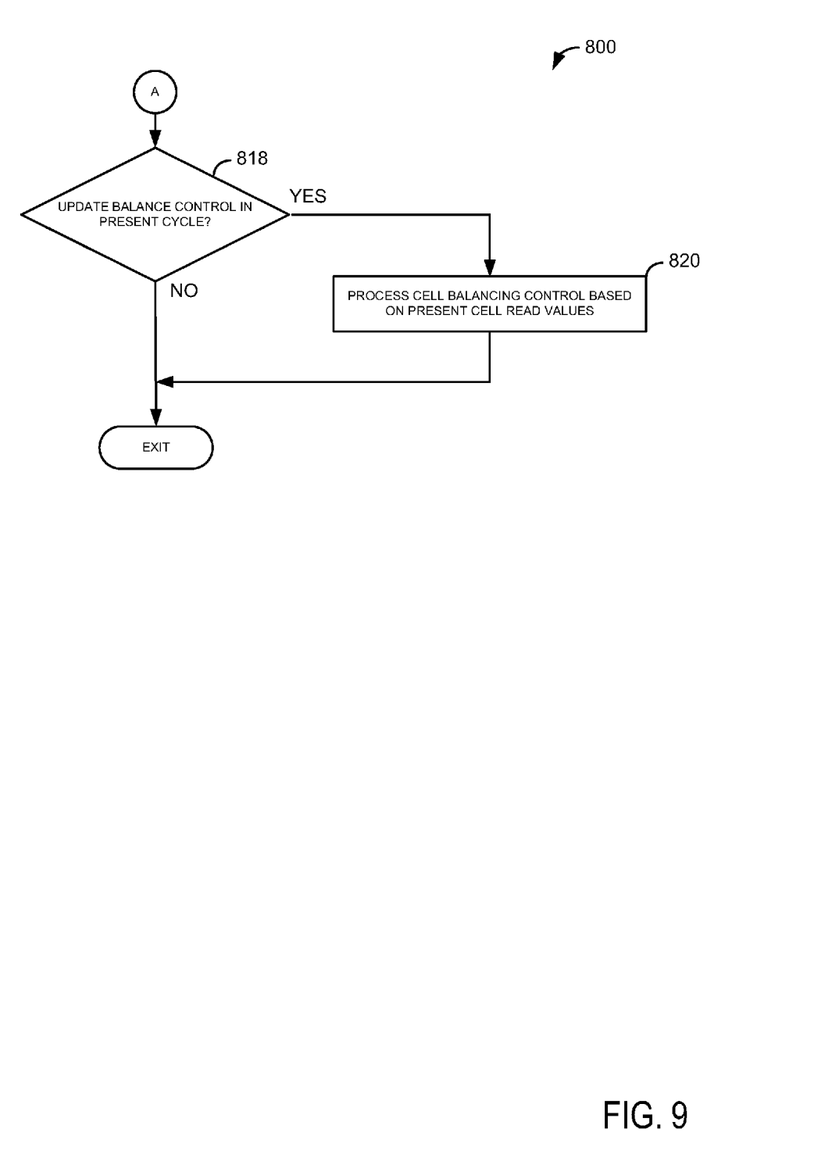
FIG. 9 shows a continuation of the flowchart from FIG. 8.

Referring now to FIGS. 8 and 9, a high level flowchart for a method to balance charge of battery cells is shown. The method of FIGS. 8 and 9 may be performed via executing instructions via a controller such as MCUs or the BCM of the system of FIGS. 1-5. In one example, the method of FIGS. 8 and 9 is executed in parallel by each MCU within the battery pack. Thus, each battery cell stack At 802, method 800 stops battery cell charge balancing. Battery cell charge balancing may be stopped by electrically decoupling a load from a battery cell or by decoupling an active charging device from a battery cell. In one example, circuitry to balance battery cells is the circuitry described in FIG. 5. Method 800 proceeds to 804 after battery cell charge balancing is stopped.

At 804, battery cell charge is sampled via simultaneously sampling battery cell charge for each battery cell of a battery cell stack. In one example, battery cell charge of each battery cell of a battery cell stack may be sampled via transferring a fraction of battery charge from each battery cell to individual capacitors. The number of capacitors may be equal to the number of battery cells. Voltages of the capacitors may be subsequently read by an ADC such that the voltage read via the ADC is representative of an amount of charge stored within each of the battery cells. Further, the capacitors allow all battery cells of a battery cell stack to be sampled simultaneously so that a large number of ADCs are not required to determine battery cell charge of each battery cell at an instant in time. In other examples, an ADC may directly read voltage of the battery cell. In one example, circuitry to sample battery charge is the circuitry described in FIG. 4. Method 804 proceeds to 806 after battery cell voltages are sampled by transferring a portion of battery charge to charge storing capacitors or via another way.

At 806, method 800 judges whether or not battery cell voltage sampling is complete. In one example, it may be judged that battery cell sampling is complete when a predetermined period of time occurs after battery cells are coupled to charging capacitors or ADCs. The predetermined amount of time allows charge to transfer from each battery cell to each capacitor so that the charge stored by the capacitor is representative of the charge of the battery cells. Method 800 proceeds to 808 after it is judged that the battery cell charge sample cycle is complete. Otherwise, method 800 remains at 806.

At 808, method 800 stops the battery charge sample cycle. In one example, switching transistors decouple battery cells from sampling capacitors so as to cease the transfer of charge from battery cells to the sampling capacitors. Alternatively, switching transistors may decouple ADCs from battery cells. In the case where capacitors are coupled to battery cells, the capacitors retain charge that is read via an ADC during processing of battery cell charge. Method 800 proceeds to 810 after sampling of all battery cells in a battery cell stack is ceased.

At 810, method 800 processes battery cell charge balancing control based on battery cell read values determined during a previous battery cell charge balancing cycle. Processing of battery cell charge balance control may include coupling a load resistor or an active charging element (e.g., capacitor or transformer) to battery cells that are scheduled to receive charge or have charge drained. Since the charge information from the battery cells sampled in the charge balancing cycle has not been processed, data or balancing information sampled during a previous battery charge balancing cycle is the initial basis for battery cell charge balancing during the present battery cell charge balancing cycle. For example, if it is determined that one battery cell of a battery cell stack has 0.2 coulombs of extra charge during a prior battery cell balancing cycle, 0.2 coulombs or some proportional amount of the excess charge is scheduled to be drained from the battery cell during the present battery cell balancing cycle. Thus, based on the processed battery cell charge information from the previous battery cell charge balancing cycle, the battery cell with excess charge is scheduled to be coupled to a load resistor for an amount of time that will drain at least a portion of the excessive charge from the battery cell having excess charge. In this way, each battery cell of a battery cell stack may be balanced so that charge differences between battery cells of a battery pack may be reduced.

Processing battery cell balancing control based on previous battery cell read values may also include determining differences in charge between battery cells of a battery cell stack and between battery cells of the entire battery pack. For example, it may be determined which battery cells of a battery pack are at lowest or highest charge. A charge difference between the battery cells of the lowest charge battery cells and the remaining battery cells may be the basis for an amount of charge to reduce from the remaining charge battery cells (e.g., higher charge battery cells), for example. Alternatively, a charge difference between the battery cells of the highest charge battery cells and the remaining battery cells may be a basis for adding charge to the remaining battery cells.

However, if conditions do not permit communication between battery stack MCUs and the BCM, processing of battery cell data may be limited to processing battery cell data of a sole battery cell stack. Processing battery cell balancing control based on previous battery cell read values may also include determining charge differences between battery cells of a battery cell stack without considering the charge of other battery cells of other battery cell stacks in the battery pack. Method 800 proceeds to 812 after processing battery cell balancing control based on previous battery cell read values determined during a previous battery cell charge balancing cycle is initiated.

At 812, method 800 reads captured battery cell charge from sampling battery cells. In one example, an ADC reads a voltage of a capacitor that holds charge representative of battery cell charge. A single ADC may read all capacitors storing charge captured during battery cell sampling. In other examples, multiple ADCs may read captured cell charge. A binary number output from the ADC may be converted to a battery cell voltage via a battery stack MCU. The battery cell voltage may then be converted to a battery cell charge amount via a transfer function that relates battery cell voltage to battery cell charge. Method 800 proceeds to 814 after reading captured battery cell charge from a battery charge sample.

At 814, method 800 updates a battery cell read value for the next or a subsequent battery cell charge balance cycle. In one example, the battery cell read value may be stored to memory where it may be accessed during the next battery cell charge balancing cycle. If a single ADC is reading battery cell samples from a plurality of battery cells, the read values for each battery cell may be updated sequentially. Method 800 proceeds to 816 after updating the read value for the next battery cell balance cycle.

At 816, method 800 judges whether or not reading of all battery cells on the stack is complete. In one example, a counter may keep track of a number of battery cells read during a battery cell charge balancing cycle. In other examples, an amount of time may be allocated for reading battery cells during a battery cell charge balancing cycle. If charge from a predetermined number of battery cells has been read or if an allotted amount of time to read a predetermined number of battery cells has expired, method 800 proceeds to 818 (see FIG. 9). Otherwise, method 800 returns to 812.

At 818, method 800 judges whether or not to update balance control in the present battery cell charge balancing cycle. In one example, battery cell charge balance control may be updated in the present battery charge balancing cycle after predetermined conditions have been met. For example, battery cell charge balance control may be updated when all battery cells of a battery pack have been read and when current drawn from the battery pack is less than a predetermined amount. Of course, other battery operating conditions such as battery temperature, time since exiting sleep mode, and battery pack degradation may also be considered. If method 800 judges to update battery cell balance control in the present battery charge balancing cycle, method 800 proceeds to 820. Otherwise, method 800 proceeds to exit.

At 820, method 800 processes battery cell balancing control based on present battery cell read values. In one example, processing battery cell balancing control includes updating battery cell balancing parameters during the present battery cell charge balancing cycle. For example, the amount of time to add or drain charge from a battery cell may be revised based on battery read data captured during the present battery cell charge balancing cycle. Thus, the amount of charge added or drained from a particular battery cell during the present battery cell charge balancing cycle may be revised based on the latest captured battery cell charge. Further, the output of calculations for determining the amount of charge to add or drain from battery cells may be revised using battery cell charge captured during the present battery cell charge balancing cycle. Method 800 exits after processing cell balancing control based on present battery cell read values.

In this way, method 800 updates and balances charge of battery cells of a battery pack so that battery cell charge balancing can occur during a time when sample data is being processed. Consequently, the amount of time for battery cell charge balancing may be reduced. In addition, less charge imbalance may be induced to the battery pack from balancing charge of different battery cells at different times.

Thus, the method of FIGS. 8 and 9 provides for balancing charge of a battery pack, the battery pack comprising a plurality of battery cell stacks, comprising: balancing charge of at least one battery cell of the battery pack during a second battery cell charge balancing cycle responsive to at least one battery cell charge sample from a plurality of battery cells sampled during a first battery cell charge balancing cycle. In this way, battery cell charge information may be used in subsequent battery cell charge balancing cycles so that battery cell charge balancing has less possibility of inducing charge imbalance to a battery pack.

In some examples, the method includes where the plurality of battery cells of the battery pack are simultaneously sampled during the first battery cell charge balancing cycle, where the plurality of battery cells of the battery pack are simultaneously sampled during the second battery cell charge balancing cycle, where balancing charge of the at least one battery cell includes passively discharging the at least one battery cell, and where balancing charge of the at least one battery cell is deactivated during simultaneously sampling of the plurality of battery cell voltages. The method further comprises balancing charge of at least a second battery cell after simultaneously sampling the plurality of battery cell voltages of the battery pack during the first battery cell charge balancing cycle and before simultaneously sampling the plurality of battery cell voltages of the battery pack during the second battery cell charge balancing cycle.

The method also includes where voltages of the plurality of battery cells of the battery pack are simultaneously sampled during the first and second battery cell charge balancing cycles. In some examples, the method further comprises balancing charge of the at least one battery cell of the battery pack during the second battery cell charge balancing cycle responsive to the plurality of battery cells sampled simultaneously during the second battery cell charge balancing cycle. The method also includes where the battery pack is comprised of a plurality of battery cell stacks and where at least two of the plurality of battery cell stacks have a different number of battery cells electrically coupled in series. The method further includes where initiating of battery cell charge balancing of the plurality of battery cell stacks occurs substantially simultaneously. The method further includes where balancing charge of at least one battery cell includes actively charging or discharging the at least one battery cell via a charge storing device.

The method of FIGS. 8 and 9 also provides for balancing charge of a battery pack, the battery pack comprising a plurality of battery cell stacks, comprising: substantially simultaneously sampling a plurality of battery cells of a first battery cell stack and a plurality of battery cells of a second battery cell stack, the second battery cell stack including a different number of battery cells electrically connected in series than the first battery cell stack; and substantially simultaneously balancing charge of at least one battery cell of the first battery cell stack and at least one battery cell of the second battery cell stack after simultaneously sampling the plurality of battery cells from the first battery cell stack and the plurality of battery cells of the second battery cell stack. The method further comprises, simultaneously sampling the plurality of battery cells of the first battery cell stack and the plurality of battery cells of the second battery cell stack responsive to an instruction from a battery control module.

In some examples, the method includes where charge of the at least one battery cell of the first battery cell stack and the at least one battery cell of the second battery cell stack is charge balanced according to battery charge sampled during a previous battery cell charge balancing cycle that occurred before the substantially simultaneous sampling of the plurality of battery cells of the first battery cell stack and the plurality of battery cells of the second battery cell stack. In this way, battery cell charge sampled in the same time interval can be used to subsequently balance battery cell charge. The method further comprises balancing charge of the at least one battery cell of the first battery cell stack and the at least one battery cell of the second battery cell stack in response to battery charge sampled during the simultaneous sampling of the plurality of battery cells of the first battery cell stack and the plurality of battery cells of the second battery cell stack. The method includes where the plurality of battery cells of the first battery cell stack and the plurality of battery cells of the second battery cell stack are passively charge balanced via load resistors. The method further comprises, independently processing data from the simultaneous sampling of the plurality of battery cells of the first battery cell stack and the simultaneous sampling of the plurality of battery cells of the second battery cell stack.

As will be appreciated by one of ordinary skill in the art, method described in FIGS. 8 and 9 may be represented by instructions for a controller and may be represented by one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, functions, or methods may be repeatedly performed depending on the particular strategy being used.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for balancing charge of a battery pack, the battery pack comprising a plurality of battery cell stacks, comprising:
    balancing charge of at least one battery cell of the battery pack during a second battery cell charge balancing cycle responsive to at least one battery cell charge sample from a plurality of battery cells sampled during a first battery cell charge balancing cycle; and
    balancing charge of the at least one battery cell of the battery pack during the second battery cell charge balancing cycle responsive to the plurality of battery cells sampled simultaneously during the second battery cell charge balancing cycle.

2. The method of claim 1, where the plurality of battery cell stacks of the battery pack are simultaneously sampled during the first battery cell charge balancing cycle, where balancing charge of the at least one battery cell includes passively discharging the at least one battery cell, and where balancing charge of the at least one battery cell is deactivated during simultaneously sampling of a plurality of battery cell voltages.

3. The method of claim 2, further comprising balancing charge of at least a second battery cell after simultaneously sampling the plurality of battery cell voltages of the battery pack during the first battery cell charge balancing cycle and before simultaneously sampling the plurality of battery cell voltages of the battery pack during the second battery cell charge balancing cycle.

4. The method of claim 1, where voltages of the plurality of battery cell stacks of the battery pack are simultaneously sampled during the first battery cell charge balancing cycle.

5. The method of claim 1, where the battery pack is comprised of the plurality of battery cell stacks and where at least two of the plurality of battery cell stacks have different numbers of battery cells electrically coupled in series.

6. The method of claim 5, where initiating of battery cell charge balancing of the plurality of battery cell stacks occurs substantially simultaneously.

7. The method of claim 1, where balancing charge of at least one battery cell includes actively charging or discharging the at least one battery cell via a charge storing device.

8. A method for balancing charge of a battery pack, the battery pack comprising a plurality of battery cell stacks, comprising:
    simultaneously sampling a plurality of battery cells of a first battery cell stack and a plurality of battery cells of a second battery cell stack, the second battery cell stack including a different number of battery cells electrically connected in series than the first battery cell stack; and
    simultaneously balancing charge of at least one battery cell of the first battery cell stack and at least one battery cell of the second battery cell stack after simultaneously sampling the plurality of battery cells from the first battery cell stack and the plurality of battery cells of the second battery cell stack.

9. The method of claim 8, further comprising simultaneously sampling the plurality of battery cells of the first battery cell stack and the plurality of battery cells of the second battery cell stack responsive to an instruction from a battery control module.

10. The method of claim 8, where charge of the at least one battery cell of the first battery cell stack and the at least one battery cell of the second battery cell stack is charge balanced according to battery charge sampled during a previous battery cell charge balancing cycle that occurred before the simultaneous sampling of the plurality of battery cells of the first battery cell stack and the plurality of battery cells of the second battery cell stack.

11. The method of claim 10, further comprising balancing charge of the at least one battery cell of the first battery cell stack and the at least one battery cell of the second battery cell stack in response to battery charge sampled during the simultaneous sampling of the plurality of battery cells of the first battery cell stack and the plurality of battery cells of the second battery cell stack.

12. The method of claim 8, where the plurality of battery cells of the first battery cell stack and the plurality of battery cells of the second battery cell stack are passively charge balanced via load resistors.

13. The method of claim 8, further comprising independently processing data from the simultaneous sampling of the plurality of battery cells of the first battery cell stack and the simultaneous sampling of the plurality of battery cells of the second battery cell stack.

14. A system for balancing charge of a battery pack, comprising:
   a first battery cell stack comprised of a first actual total number of battery cells;
   a first monitoring and charge balancing controller electrically coupled to the first battery cell stack, the first monitoring and charge balancing controller including instructions for monitoring and charge balancing battery cells in the first battery cell stack;
   a second battery cell stack comprised of a second actual total number of battery cells different from the first actual total number of battery cells;
   a second monitoring and charge balancing controller electrically coupled to the second battery cell stack, the second monitoring and charge balancing controller including instructions for monitoring and charge balancing battery cells in the second battery cell stack, the second monitoring and charge balancing controller including further instructions for starting charge balancing of battery cells in the second battery cell stack substantially simultaneously with starting charge balancing of battery cells in the first battery cell stack; and
   a battery control module including a battery controller, the battery controller in electrical communication with the first and second monitoring and charge balancing controllers, where the battery cells in the first battery cell stack include battery cells electrically coupled in parallel, where the battery cells in second battery cell stack include battery cells electrically coupled in parallel, where the battery controller includes instructions to initiate substantially simultaneous sampling of battery cells in the first and second battery cell stacks, and the battery controller including further instructions for balancing charge of the battery cells of the first battery cell stack during a second battery cell charge balancing cycle responsive to at least one battery cell charge sample from the battery cells of the first battery cell stack sampled during a first battery cell charge balancing cycle.

15. The system of claim 14, where the first monitoring and charge balancing controller includes instructions for processing charge balancing data for the first actual total number of battery cells and the second monitoring and charge balancing controller includes instructions for processing charge balancing data for the second actual total number of battery cells.

16. The system of claim 14, further comprising passive charge balancing circuitry electrically coupled to the first monitoring and charge balancing controller, and passive charge balancing circuitry electrically coupled to the second monitoring and charge balancing controller.

17. The system of claim 14, further comprising active charge balancing circuitry electrically coupled to the first monitoring and charge balancing controller, and active charge balancing circuitry electrically coupled to the second monitoring and charge balancing controller.

* * * * *